United States Patent [19]
Wolfe

[11] Patent Number: 5,276,623
[45] Date of Patent: Jan. 4, 1994

[54] SYSTEM FOR CONTROLLING SUSPENSION DEFLECTION

[75] Inventor: Paul T. Wolfe, Erie, Pa.

[73] Assignee: Lord Corporation, Erie, Pa.

[21] Appl. No.: 799,501

[22] Filed: Nov. 27, 1991

[51] Int. Cl.$^5$ ............................................. B60G 17/015
[52] U.S. Cl. .............................. 364/424.05; 280/707; 280/840
[58] Field of Search .................. 364/424.05; 280/707, 280/840, DIG.

[56] References Cited

U.S. PATENT DOCUMENTS

| | | | |
|---|---|---|---|
| 3,807,678 | 4/1974 | Karnopp et al. | 248/358 R |
| 4,491,207 | 1/1985 | Boonchanta et al. | 188/299 |
| 4,502,006 | 2/1985 | Goodwin et al. | 324/208 |
| 4,635,959 | 1/1987 | Nakano et al. | 280/707 |
| 4,756,549 | 7/1988 | Kurosawa et al. | 280/707 |
| 4,821,849 | 4/1989 | Miller | 188/280 |
| 4,825,370 | 4/1989 | Kurosawa | 364/424.05 |
| 4,838,392 | 6/1989 | Miller et al. | 188/277 |
| 4,881,172 | 11/1989 | Miller | 364/424.05 |
| 4,887,699 | 12/1989 | Ivers et al. | 188/378 |
| 4,897,776 | 1/1990 | Urababa et al. | 364/424.05 |
| 4,898,264 | 2/1990 | Miller | 188/275 |
| 4,936,425 | 8/1990 | Boone et al. | 188/299 |
| 4,948,163 | 8/1990 | Kikushima et al. | 280/707 |
| 4,949,573 | 8/1990 | Wolfe et al. | 73/118.1 |
| 4,953,089 | 8/1990 | Wolfe | 364/424.05 |
| 4,984,819 | 1/1991 | Kakizaki et al. | 280/707 |
| 4,984,820 | 1/1991 | Uchiyama et al. | 280/707 |
| 5,062,657 | 11/1991 | Majeed | 280/707 |
| 5,071,159 | 12/1991 | Kamimura et al. | 280/707 |
| 5,089,966 | 2/1992 | Fukushima et al. | 364/424.05 |
| 5,162,996 | 11/1992 | Matsumoto et al. | 280/707 |
| 5,168,448 | 12/1992 | Matsumoto et al. | 280/707 |

OTHER PUBLICATIONS

SAE 881133, L. R. Miller, C. M. Nobles, 8-88, "The Design and Development of a Semi-active Suspension for a Military Tank".
IEEE, vol. 3, 1988, Proceedings of the 27th CDC of IEEE, "Tuning Passive, Semi-Active and Fully Active Suspensions", L. R. Miller.
Lord ®, DS-7023, brochure, Nov. 1991.
Lord ®, LL-2140, Technical Article, E. J. Krasnicki, Jul. 1981, "The Experimental Performance of an On/-Off Damper".
Lord ®, LL-7004, Technical Article, M. J. Crosby, R. A. Harwood, D. Karnopp, Feb. 1980, "Vibration Control using Semi-Active Force Generators", p. 1.
SAE 892487, M. Ahmadian, R. H. Marjoram, Nov. 1989, "Effect of Passive and Semi-Active Suspensions on Body & Wheel Hop Control".
SAE 892484, D. E. Ivers, L. R. Miller, Nov. 1989", Experimental Comparison of Passive, Semi-Active On/Off and Continuous Suspension".
SAE 892483, M. R. Jolly, L. R. Miller, Nov. 1989, "The Control of Semi-Active Dampers Using Relative Feedback Signals".

Primary Examiner—Gary Chin
Attorney, Agent, or Firm—Randall S. Wayland; Richard K. Thomson

[57] ABSTRACT

A method and apparatus for controlling suspension deflection in a semiactive damping system is disclosed. A semiactive control policy operates to set the damper force to a low magnitude when the relative position of the suspension members is within a "null band," and to a high magnitude when the relative position is within an "overshoot" band. The null band is a predefined range of displacement about the equilibrium position of the members and the overshoot band is a range about the end stops. When in the overshoot band, the high damper force limits the incidence of suspension end stop collisions that cause damaging shock inputs to the system. The high damper force is maintained once the overshoot band is entered until the relative position of the members again reaches the equilibrium position. One or more intermediate or "active" bands are defined to exist between the null and overshoot bands. When in the active band(s), the damper force is set to an intermediate magnitude to thus stiffen the suspension. A controller produces an output signal indicative of the instantaneous relative position of the members for use by the control policy from a relative velocity signal.

19 Claims, 5 Drawing Sheets

SYSTEM FOR CONTROLLING SUSPENSION DEFLECTION

FIELD OF THE INVENTION

The invention relates generally to vehicle suspension control systems and particularly to a system for controlling suspension deflection for relatively movable members interconnected by a semiactive damper assembly.

BACKGROUND OF THE INVENTION

Intelligent isolation systems are used to control input disturbances or forces transmitted between relatively movable members such as a vehicle body (a sprung mass) and a support or vehicle wheel (an unsprung mass) in order to provide desired ride characteristics.

Semiactive isolation systems are a type of intelligent isolation system which require no external energy other than that needed to actuate valves, and power the sensors and controls, yet are capable of providing for rapid changes in the damping coefficient of a damper interconnecting the members so as to optimize the attenuation of forces between the members. Semiactive systems are distinguished from fully active systems which employ an external power source or force generator for supplying energy in a controlled manner to counteract vibrational forces. Fully active systems are disadvantageous in that they require a large auxiliary power source and are not fully responsive at high operating frequencies due to inadequacies of such equipment to respond rapidly to control signals. Fully active systems are also characterized by dangerous failure modes.

A limitation of semiactive systems is that they only are capable of creating a force opposing motion in a suspension system and cannot create a force in the direction of motion. Thus, the term "semiactive" refers to control systems which are only capable of removing energy from a suspension system. Semiactive systems are nonetheless capable of performance approaching that of a fully active system when operated pursuant to a suitable control policy, and in particular those control policies which emulate a hypothetical "skyhook" damper as described in Karnopp, D. C. et al., "Vibration Control Using Semiactive Force Generators," ASME Paper No. 73-DET-123 (June 1974), incorporated herein by reference. Semiactive dampers and control policies for them, are disclosed in Karnopp, U.S. Pat. No 3,807,678; Miller et al., U.S. Pat. Nos. 4,821,849, 4,838,392 and 4,898,264; Boone, U.S. Pat. No. 4,936,425; and Ivers, U.S. Pat. No. 4,887,699, all owned by the assignee of the present invention. The disclosures of the foregoing patents are incorporated herein by reference.

Dampers used in a semiactive system may be either of the "off/on" type, of the "orifice-setting" type, or of the "force-controlled" type. An "off/on" semiactive damper is switched, in accordance with the dictates of a suitable control policy, between alternative "on" and "off" damping states or conditions. In the "on" state, the damping coefficient of the damper is of a preselected, relatively high magnitude. The term damping coefficient as used herein is understood to mean the relationship of the damping force generated by the damper to the relative velocity across the damper, which relationship is not necessarily linear. In its "off" state, the damping coefficient of the damper is approximately zero or of a relatively low magnitude sufficiently greater than zero so as to discourage "wheel hop". An orifice-setting semiactive damper is also switched during operation between an "off" state, where the damping coefficient is approximately zero or of some relatively low magnitude, and an "on" state. However, when a orifice-setting semiactive damper is in its "on" state the damping coefficient thereof may be and normally is changed between a large (theoretically infinite) number of different magnitudes. The magnitude of the damping coefficient is typically determined by the diameter setting of the valve orifice in the damper.

A "force-controlled" damper, in theory, is capable of creating any desired dissipative force in the "on" state independent of the relative velocity across the damper. This is in contrast to the aforementioned "off/on" and "orifice-setting" dampers in which the damping force in the "on" state depends on the relative velocity across the damper. A force-controlled damper can either be realized by use of feedback control or by use of pressure control valves. In the "off" state the force-controlled damper will command the valve to the full-open position in which the damping coefficient is approximately zero or of some relatively low value.

A characteristic of semiactive isolation systems employing an above-described "skyhook" control policy or a derivative thereof is that they tend to increase the average rang of suspension deflection from the equilibrium position in order to provide a "smoother" ride. Although these systems offer significant performance advantages over other types of isolation systems, difficulties can occur when the suspension is subjected to large, abrupt input disturbances such as those encountered on rough terrain or upon the landing of an aircraft, for example. Undesirable transient responses in the form of excessive vehicle body motions or suspension excursions result in uncomfortable or damaging force inputs to a vehicle throughout the range of motion of the suspension and also when the suspension experiences abrupt impacts upon reaching its end of travel. This tendency is discussed in Miller, "Tuning Passive, Semiactive and Fully Active Suspension Systems," Proceedings of the 27th CDC of IEEE, Vol. 3, 1988 and in Ivers et al., "Experimental Comparison of Passive, On/Off Semiactive and Continuous Semiactive Suspensions" SAE Paper No. 892484, Dec. 7, 1989.

The incidence of undesirable transient responses could be reduced or even eliminated by use of a very stiff damper with a high damping coefficient. However, this would defeat the performance advantages of semiactive control by unnecessarily limiting the available range of suspension deflection for the given range of motion of the suspension and unacceptably degrade the isolation of the vehicle.

SUMMARY OF THE INVENTION

The foregoing problems are solved and a technical advance is achieved by the method and apparatus of the present invention in which suspension deflection in a semiactive damping system is controlled by setting the damper force magnitude according to the relative position of the suspension members where the relative position is divided into predefined ranges or "bands."

In a departure from the art, a semiactive control policy operates to set the damper force or damping coefficient to a low magnitude when the relative position of the members is within a "null band," and to a high magnitude when the relative position is within an "overshoot" band. The null band is a predefined range of displacement about the equilibrium position of the members. The overshoot band is a predefined range of displacement about the end stops of the members. When the system is operating in the overshoot band, the high magnitude damper force prevents or at least limits the incidence of suspension end stop collisions that cause uncomfortable or damaging shock inputs to the suspension system. Further, the high magnitude damper force is commanded once the overshoot band is entered and maintained until the relative position of the members again reaches the equilibrium position. By maintaining this high magnitude, the suspension is quickly stabilized at the equilibrium ride height and resonant frequencies are quickly dissipated.

In an illustrative embodiment, the apparatus of the present invention includes a unique controller for controlling the deflection of the members in a semiactive suspension system. The controller implements a deflection control policy which sets the damper force of the system responsive to signals indicative of the relative position of the movable suspension members. The damper force is set to a minimum when the relative position of the members is in the null band. In this condition, the system experiences a dynamically "soft" ride with relatively good isolation of the supported member. The damper force is set to maximum when the relative position is in the overshoot band. The maximum damping is maintained until the system returns to the equilibrium position. The ride height of the vehicle is thus stabilized efficiently without the undesirable bouncing or heave sometimes experienced in other systems. The damper force may also be set according to one or more intermediate or "active" band(s), defined to exist between the null and overshoot bands. When in an active band, the damper force is set to an intermediate magnitude to thus stiffen the suspension. However, if the system operating in an active band is not moving away from the equilibrium position i.e., the force input has already occurred and the system is beginning to return to the equilibrium position, then the controller selects the low magnitude damper force so that superior isolation is experienced.

In another aspect of the invention, the controller produces an output signal indicative of the instantaneous relative position of the members from a relative velocity signal received from a sensor in the suspension. The relative position signal is utilized by a deflection control module embodying the deflection control policy to produce a damper command force signal which is then forwarded to the semiactive damper. An analog integrator receives the relative velocity signal and produces therefrom a time-integrated signal. A digital stabilizer receives the time integrated signal, filters it and produces a feedback signal to the integrator to offset the constant and low frequency components of the signal. The result is a signal which is stabilized about a selected oscillatory voltage range. A digital filter then receives the stabilized, integrated signal and filters it to locate the short term frequency mean of the signal about a selected voltage value. The controller thus provides a signal indicative of relative position which may then be used to implement the deflection control policy.

In a further aspect of the invention, the deflection control policy is implemented by computer program instructions stored in the controller.

An important technical advantage achieved with the present invention is the prevention or at least reduction of suspension end-stop collisions occasioned by abrupt force inputs to the suspension system, solved by adjusting the damper force to high magnitude when the system is in an overshoot band and maintaining the high magnitude damper force until the system again reaches equilibrium. Proper ride height as well as axle-loading is thus maintained in the system in a manner especially well suited to suspension applications with large suspension travel such as that experienced in cab suspensions and off-road vehicles.

An additional technical advantage achieved with the present invention is that suspension isolation is also taken into account for providing a smooth ride by operation of the system to produce a minimum damper force when the system is in a null band and also when in an intermediate, active band(s) if the system is returning to equilibrium, thus resulting in improved isolation.

BRIEF DESCRIPTION OF THE DRAWINGS

The novel features believed characteristic of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENT

Figure 1:
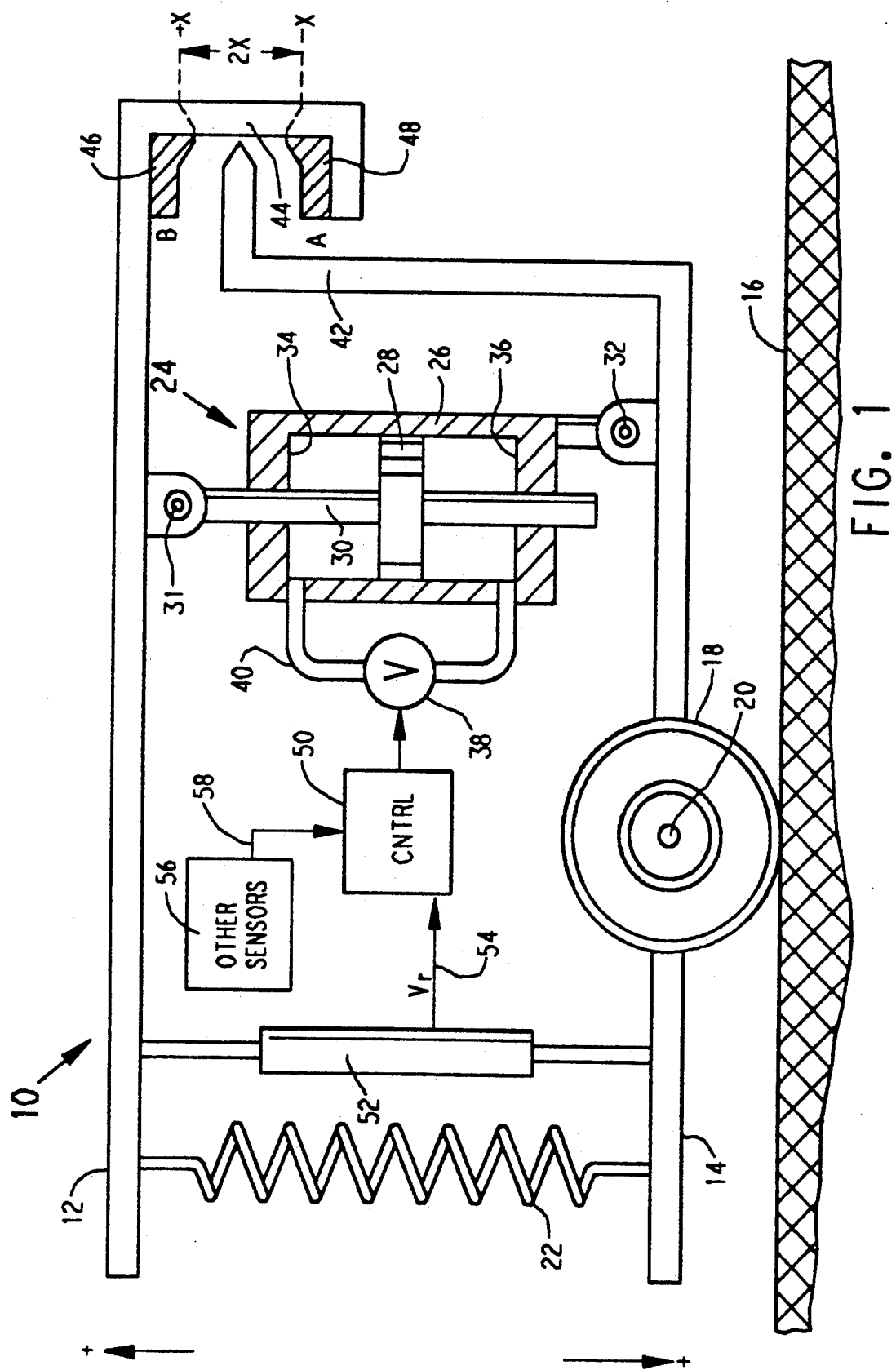
FIG. 1 is a schematic view of a force attenuating suspension or similar mounting system which includes a semiactive damper assembly controllable in accordance with the present invention.

In FIG. 1 of the drawings, the reference numeral 10 designates a two degree of freedom suspension or similar force-attenuating mounting system incorporating features of the present invention. The system 10 interconnects vertically-spaced and relatively movable supported and supporting members 12, 14. By way of example, the members 12, 14 may respectively be the body and unsprung mass components of a truck, aircraft or other motor vehicle that is supported upon a surface 16 by one or more conventional, resiliently deformable tire members 18, only one of which is shown. An axle 20 supports the tire member 18 relative to the supporting member 14. A primary function of the system 10 is to isolate the supported member 12 insofar as possible from vibratory and/or other forces transmitted by the member 14 by input disturbances such as road-surface irregularities, abrupt impacts, or the like. The system 10 is especially well suited to applications in which large suspension travels are experienced such as in off road vehicles or trucks where permitted suspension travel is insufficient relative to input disturbances.

A primary suspension spring 22 and a semiactive damper assembly 24 extend in substantially parallel relationship to each other between the members 12, 14 and are connected to the members The damper assembly 24 is of the hydraulic piston and cylinder type having a hydraulic cylinder 26 enclosing a piston 28. A piston rod 30 is connected to the piston 28 and is secured to the supported member 12 by a suitable connector including, for example, a bushing 31 formed by elastomer or similar resilient, compliant material. The cylinder 26 is secured to the supporting member 14 by a suitable connector which includes, for example, a deformable bushing 32, also formed of elastomer or similar resilient, compliant material. Relative vertical movement between the members 12, 14 causes relative vertical movement between the cylinder 26 and the piston 28, which in turn displaces a hydraulic fluid (not shown) between upper and lower variable volume fluid chambers 34, 36 of the cylinder 26, via an electrically or otherwise rapidly adjustable control valve 38 forming part of a hydraulic circuit 40 interconnecting such chambers. Such circuitry is often contained wholly within the piston 28. The rod 30 of the damper assembly 24 illustratively extends through both of the fluid chambers 34 and 36 such that the amount of fluid displaced between the chambers is the same irrespective of whether the displacement is produced by compression or by extension of the assembly 24. Alternatively, an accumulator or the like (not shown) is connected to the chamber 36.

The damper assembly 24 is of the continuous force-controlled type such as that utilized in Ivers et al., "Experimental Comparison of Passive, Semi-active On/Off and Semi-active Continuous Suspensions", SAE Technical Paper Series No. 892484, November, 1989. The damper assembly 24 is rapidly switchable between an "off" damping state or condition in which the damping coefficient of the damper is of relatively low magnitude (which in some cases is approximately zero), and an "on" state wherein a desired force is created independently of the velocity across the damper. The damper assembly 24 is switchable between the "on" and "off" states, as will be discussed below, to isolate the system 10 in order to provide a smooth ride, while also preventing end-stop collisions, wheel hop and other undesirable motion conditions normally caused by input disturbances.

As will be described below, a deflection control policy of the present invention determines when the assembly 24 is in the "on" state and also the damping coefficient in the "on" state according to the "band" or operating state of the system 10, based on the position or relative displacement of the members 12, 14.

Changes in the damping state of the damper assembly 24 result from control signals that are imparted to an actuator (not shown) of the valve 38 and that cause the valve to throttle or restrict fluid flow through the valve to the extent indicated by the signals. The valve 38 may be of a mechanical, electrorheological, magnetorheological or any other type capable of rapid operation in the foregoing manner. It is understood that the assembly 24 may be commanded to produce a desired force regardless of the magnitude of the relative velocity of the system, although some hardware limitations do apply.

In an alternative embodiment, it is understood that the damper assembly 24 is a simple orifice-setting damper. An orifice-setting damper is limited in that it is unable to produce an arbitrary force on command, and is only capable of responding to a valve position command. Preferably, many valve positions are required to adequately implement the proposed deflection control.

Two interlocking members 42 and 44 ar respectively connected to the members 12, 14 and schematically represent the limits of suspension travel for the system 10, it being understood that the limits of suspension travel are typically built into the damper assembly 24. The reference letter "A" represents the extension ("rebound") end stop of the system 10 which is reached when the members 12, 14 reach full extension away from each other. The reference letter "B" represents the retraction ("jounce") end stop of the system 10 which is reached when the members 12, 14 are in a fully retracted or compressed position with respect to each other. Snubbers 46, 48 are respectively located at end stops A, B. The snubbers 46, 48 are usually resilient, deformable members made of elastomeric material or the like and serve to cushion the impact of the members 42, 44 when engaging the end stops A, B.

The designation "X" represents the relative displacement or position of the members 12, 14 relative to each other from an equilibrium point in which X is zero. Generally, the equilibrium point is an indication of the ride height of the system 10. Here it is assumed for simplicity that the equilibrium position is midway between the members 42, 44, but may vary depending on the load placed on the system 10 or the motion condition of the system. As discussed further below, the equilibrium point is initialized for the system 10 prior to operation. The equilibrium position may be initialized according to the displacement between the members when the system is at rest and reset according to an average value of the displacement over time, taken every thirty seconds, for example.

It is arbitrarily indicated that X is positive when the members are in a position closer to each other than the equilibrium point, such as when the system 10 is in compression, and that X is negative when the members 12, 14 are in a position farther away from each other than in equilibrium, such as when the system is in extension.

A controller 50, subsequently discussed in detail, produces electronic control signals for controlling the valve 38 of the damper assembly 24 in order to instantaneously select the damping coefficient of the assembly for best isolation and to avoid impending end-stop collisions of the supported member 12. The controller 50 operates pursuant to a preselected control policy, as described further below, and receives input data from a sensor 52 which detects directly the instantaneous relative velocity (Vr) of the members 12, 14. The data from the sensor 52 is sent via line 54 to the controller 50. The sensor 52 is a velocity transducer of the type described in Wolfe, U.S. Pat. No. 4,949,573, assigned to the assignee of the present invention and incorporated herein by reference.

While not shown, other sensors such as Hall effect sensors, accelerometers, pressure sensors other sensors for determining conditions such as absolute velocity, displacement or acceleration may be utilized instead of or in combination with the sensor 52. Other sensors, designated generally by a block 56, also send data on a line 58 to the controller 50. The sensors of the block 56 can be used to indicate a variety of parameters such as brake pedal position, steering angle, vehicle attitude, trailer load, or ground speed. The block 56 also may provide for a user selection switch for selection of damping between differing modes, as an override to the control policy of the present invention, for example.

Figure 2:
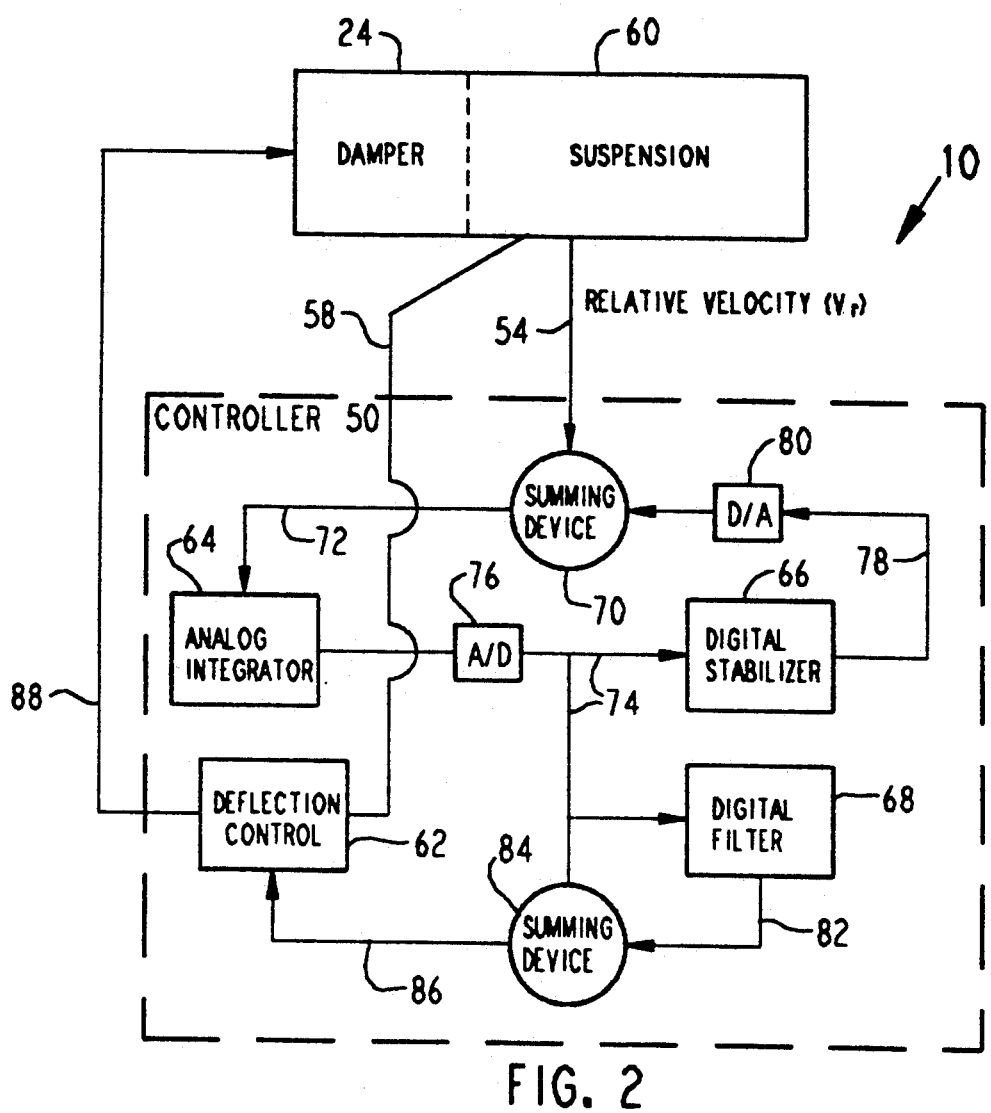
FIG. 2 is a functional block diagram of the system of FIG. 1 depicting the details of the controller.

Referring to FIG. 2, there is shown a functional block diagram of the system 10 illustrating details of the controller 50. A suspension block 60 represents the dynamic elements of the system 10, including the members 12, 14, the spring 22, the damper assembly 24 and the sensors 52, 56. The controller 50 receives electrical signals from the sensors in the suspension block 60 indicative of the relative velocity of the members 12, 14, as discussed above, on the lines 54, 58. The controller 50 processes the sensor data in real time, as described below, to supply damper command force signals (Fc) to the damper assembly 24. The signals Fc are used to vary the amount of damping of the assembly 24 in order to provide improved isolation and handling of the supported member 12. The controller 50 is embodied in analog and in digital circuitry.

The controller 50 includes a deflection control module 62, an analog integrator 64, a digital stabilizer 66 and a digital filter 68. The deflection control module 62 implements a unique deflection control policy, discussed subsequently in detail, for providing the damper command force signal Fc to the damper assembly 24. The integrator 64, the stabilizer 66 and the filter 68 cooperate to provide a signal estimate of the relative displacement or position X of the members 12, 14 from the relative velocity signal Vr received on the line 54. The signal estimate of relative position is furnished to the deflection control module 62 where the deflection control policy is implemented responsive to the position signal to produce the damper command force.

A summing device 70 of the controller 60 receives the relative velocity signal Vr and furnishes the signal on line 72 to the analog integrator 64. The integrator 64 receiving the signal Vr generates a time integrated signal. While not shown, the integrator 64 includes a first order low pass filter for eliminating signal "noise" and has a passband approximately equal to fifty. The integrator 64 is constructed using analog components such as operational amplifiers, capacitors and resistors (not shown). Relatively low frequencies are passed by the integrator 64 which can cause accumulation and drift of the time integrated signal, resulting in error. In order to avoid this occurrence, the time integrated signal output from the integrator 64 is furnished to the digital stabilizer 66 on line 74. An analog to digital converter 76 digitizes the time integrated signal passing from the integrator 64. The digital stabilizer 66 generates a feedback or offset signal responsive to the time integrated signal. The offset signal is furnished from the digital stabilizer on line 78 to the summing device 70. A digital to analog converter 80 converts the digital offset signal to analog form for receipt by the summing device 70. The offset signal is inverted and summed in the summing device 70 with the relative velocity signal Vr input from the sensor 52, to effectively subtract the low frequency signal components described above, thereby centering the time integrated signal output from the integrator 64 roughly within the voltage operating range of the analog components. Thus, selected constant and low frequency signals that would normally accumulate in the circuit to drive the output of the integrator 64 beyond the range in which useful information can be provided are removed by the described feedback loop in which the offset signal of the stabilizer 66 is furnished to the summing device. The result is a stabilized time integrated signal response within a working voltage range.

The digital filter 68 also receives the stabilized, time integrated signal on the line 74. The filter 68 further stabilizes the time integrated signal received from the integrator 64 about a zero, midrange or other selected voltage point. This is necessary because the stabilizer 66 While the stabilizer 66 just discussed constrains the signal within a voltage range, the constant and relatively low frequency components are not entirely removed. The signal, therefore, tends to fluctuate within an oscillatory voltage range, albeit within acceptable limits. The filter 68 functions to establish the signal about a constant value. More specifically, the filter 68 operates as a high pass filter to eliminate excess low frequency components of the stabilized signal which locates the short term mean of the relatively high frequency components about a selected, constant voltage value. If the selected voltage value is zero, the resulting output is a signal proportional in magnitude and sign to the relative position of the members 12, 14.

The signal from the filter 68 sent on line 82 and is subtracted, or inverted and summed, at the summing device 84 with the signal received on the line 74 to produce the output signal proportional to the relative position of the members 12, 14. This relative position signal is sent on line 86 to the deflection control module 62 and utilized therein to produce the appropriate damper command force signal Fc. The signal Fc is sent on line 88 to the damper assembly 24 The deflection control module 62 is preprogrammed so a to operate in accordance with the deflection control policy of the present invention.

Figure 3:
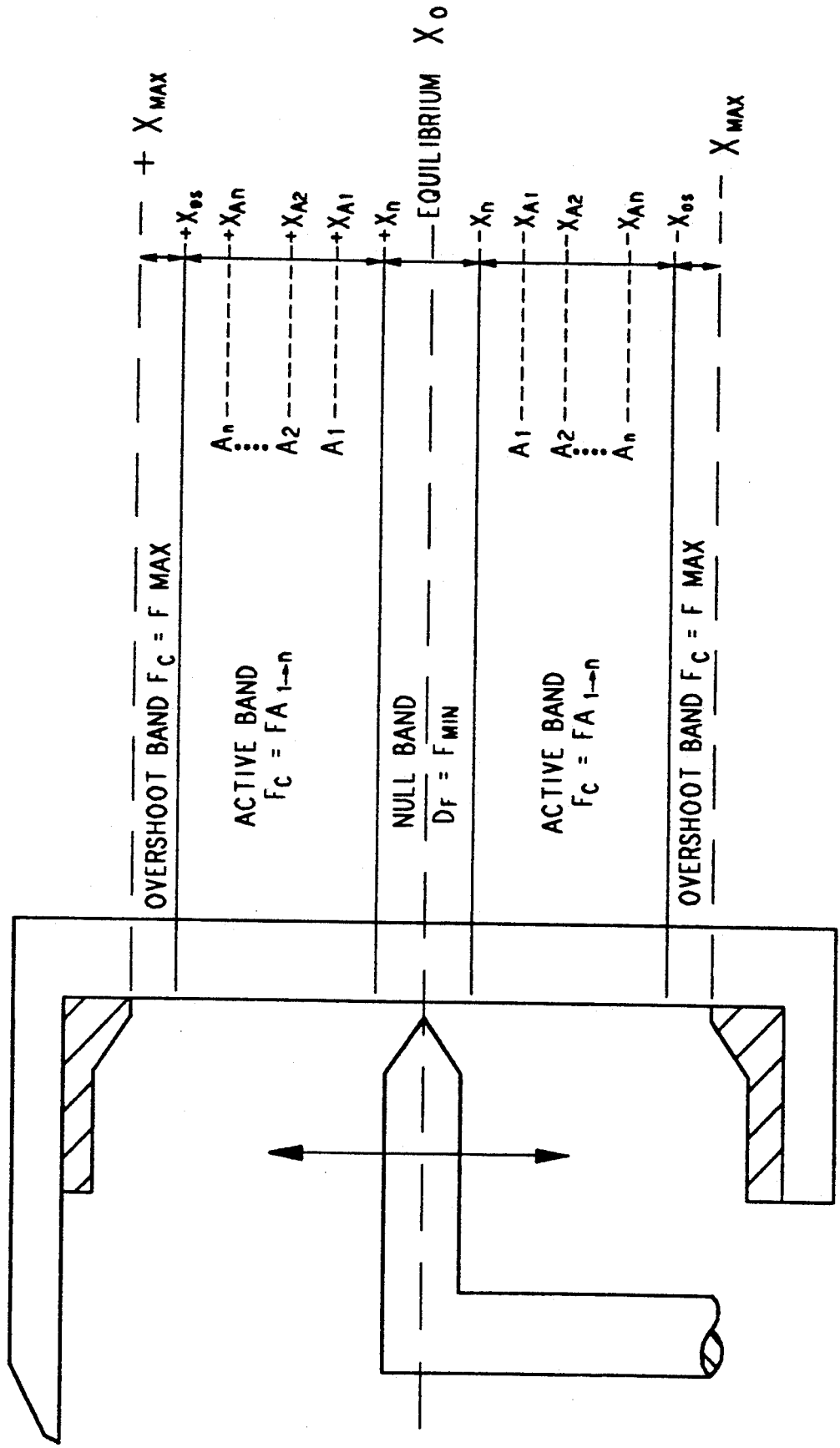
FIG. 3 is an enlarged, broken away schematic view of the system of FIG. 1 showing the operating states of the damper assembly as a function of relative position and dictated by the deflection control policy of the present invention.
Figure 4:
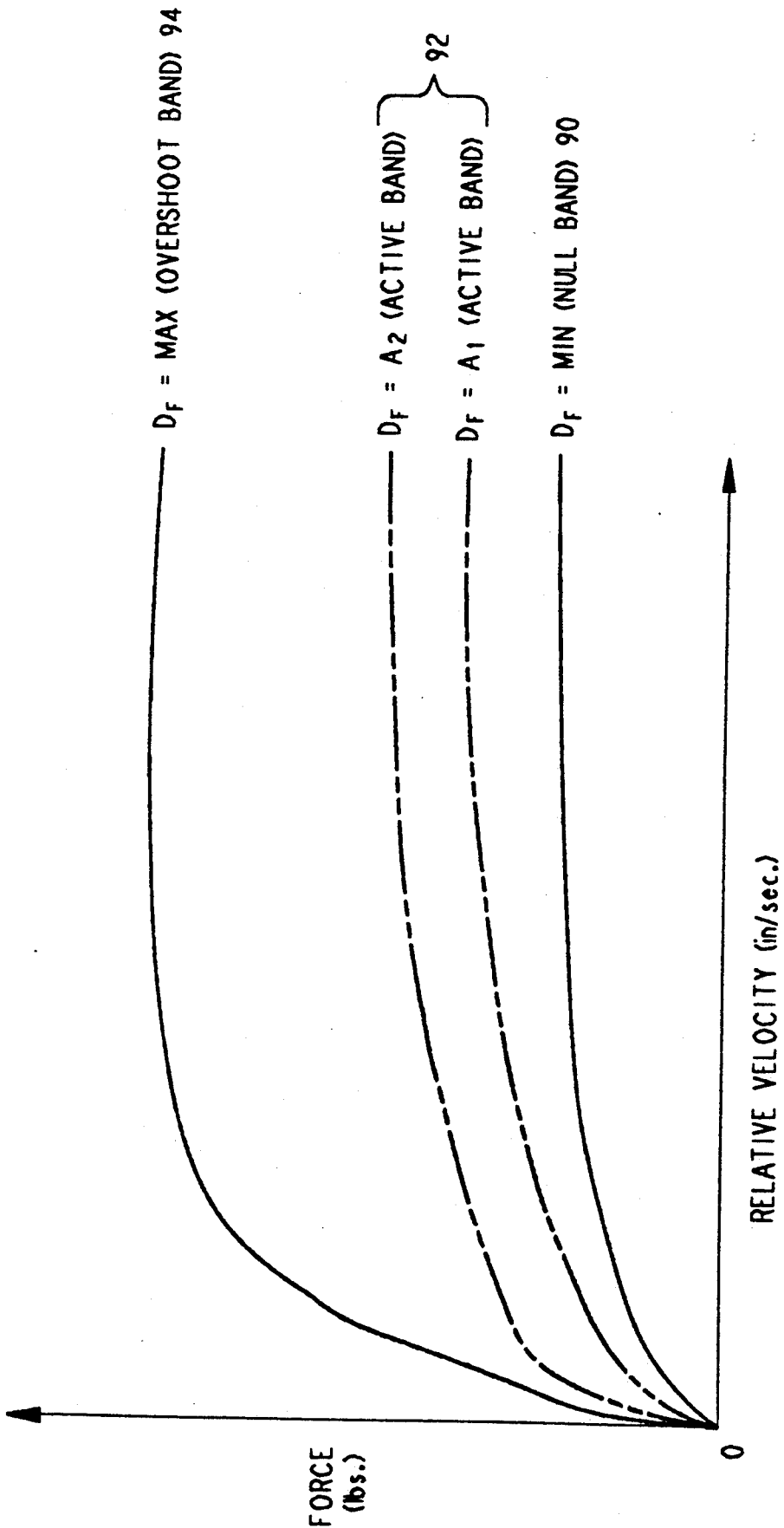
FIG. 4 is a graphical representation of the relationship between relative velocity and force showing damper force curves for the null band, active band and overshoot band operating states of the system of FIG. 1.

Referring to FIGS. 3 and 4, the deflection control policy of the present invention will now be described. The deflection control policy defines three primary bands or operating ranges for the system 10 according to the relative position of the members 12, 14. A null band 90, a active band 92 and an overshoot band 94 are defined. The damping coefficient of the assembly 24 is adjusted differently when the system is operating in each of the bands 90 92, 94, as dictated by the control policy.

The null band 90 is defined in the relative displacement region about the equilibrium point Xo between the positions +Xn and −Xn. When the system 10 is operating in the null band 90, the control policy sets the damper command force (Fc), subject to exceptions discussed below, to a preselected minimum magnitude (Fmin). Fmin is approximately zero or of other preselected relatively low magnitude as determined by the ride engineer. This provides for a relatively "smooth" ride when the system 10 is not experiencing abrupt or severe input disturbances.

The overshoot band 94 is defined in the displacement region between +Xos and Xmax and between −Xos and −Xmax. When the system 10 is operating in the overshoot band 94, the control policy sets Fc equal to a preselected maximum magnitude (Fmax). Fmax is equal to a maximum or a preselected relatively high magnitude as determined by the ride engineer. This prevents or eliminates the severity of impacts with the suspension end-stops.

The active band is defined in the displacement region between +Xn and +Xos and between −Xn and −Xos. When the system 10 is operating in the active band 92, the control policy sets Fc, subject to exceptions discussed below, to a preselected intermediate force value (Fa). This causes a "stiffer" ride when the system 10 experiences larger force inputs such as when traveling over rough terrain, but not force inputs sufficient to cause end stop collisions. The active band 92 may be divided into a number of active sub-bands A1 through An. For example, the active sub-band A1 is defined in the displacement region between +Xn and +XA1 and between −Xn and −XA1. Other representative sub-bands are similarly defined in displacement regions designated by +XA2, +XAn, −XA2, −XAn. In the active sub-bands A1 through An, Fc is set to differing magnitudes FA1 through FAn, respectively. Typically, the magnitude of Fc will increase in each of the active sub-bands as the sub-bands move away from the equilibrium point. While the implementation of one or more sub-bands is not required, the use of sub-bands provides advantages in precision tuning.

FIG. 4 depicts the damper command force curves for the null band 90, the active band 92 in which there are two sub-bands A1 and A2, and the overshoot band 94. The damper command force Fc is plotted with respect to the relative velocity of the members 12, 14 for the system 10.

Figure 5:
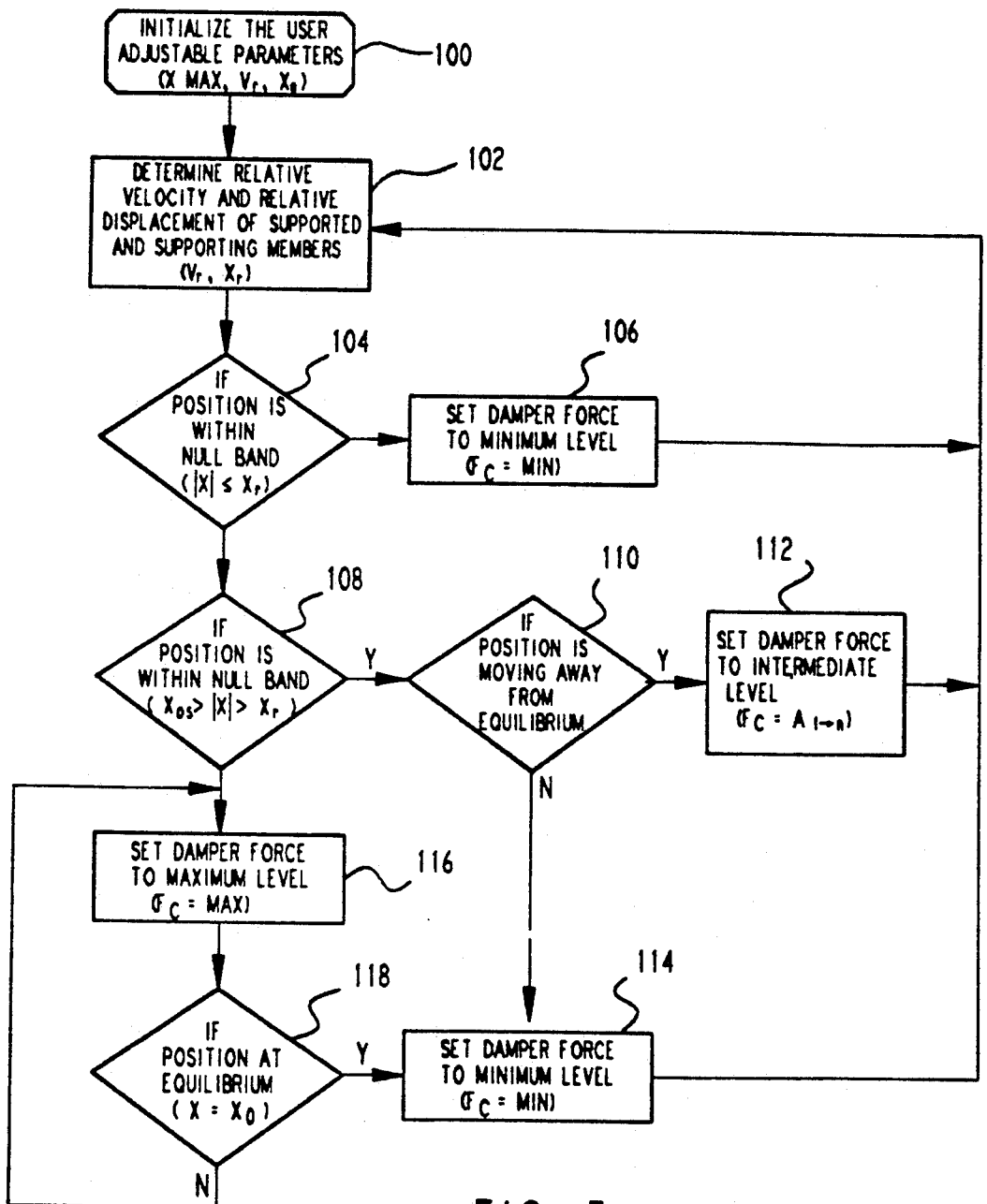
FIG. 5 is a flow chart illustrating the logic of the deflection control policy of the present invention.

FIG. 5 is a flow chart illustrating control logic for operating the system 10 in accordance with the deflection control policy of the present invention. It is understood that the control logic is implemented by computer program instructions stored in the controller 50. The actual program code to perform these functions may be generated using conventional programming techniques, and is therefore omitted herein for clarity.

In step 100, parameters of the system 10 are initialized which vary depending on the dimensions, damper configuration and operating environment of the system. These parameters include, for example, the available relative displacement Xmax from equilibrium of the members 12, 14, the relative velocity Vr of the members, the equilibrium position or ride height Xo, as well as any number of other parameters well known to those skilled in the art. The equilibrium position Xo is initialized, for example, by a "zeroing" function which takes a reading of the average d.c. component of the signal from the sensor 52 taken every thirty seconds. This average signal is used to determine the average equilibrium position or ride height of the system 10 which is then compared to the instantaneous signal in determining the relative position X, as discussed below. The user adjustable parameters are sampled periodically and then reset.

Once the above parameters are initialized, the override control policy may proceed to perform its remaining functions in a repeat loop whereby the damper command force signal Fc is determined and provided to the damper assembly 24 on the order of once every few milliseconds. In step 102, the relative velocity Vr and the relative displacement Xr of the supported and supporting members 12, 14 are determined. The relative velocity Vr of the members 12, 14 is determined instantaneously by the sensor 52 which furnishes a signal representing Vr on the line 54 to the controller 50. As described above, the analog integrator 64, the stabilizer 66 and the filter 68 cooperate in a unique manner to generate a signal indicative of the relative position X of the members 12, 14. The signal is input to the deflection control module 62 on the line 86.

In step 104 a determination is made whether the position X is within the null band 90. If in step 104 the position X is within the null band 90, execution proceeds to step 106. In step 106, the damper command force Fc is set to the minimum magnitude Fmin. The signal representing Fmin is sent from the module 62 on the line 88 to the damper assembly 24. Execution then returns to step 102.

If in step 104 the position X is not within the null band 90, execution proceeds to step 108. In step 108, a determination is made whether the position X is within the active band 92. If the position X is within the active band 92, then control proceeds to step 110. In step 110, a decision is made whether the position X is moving away from the equilibrium position X0. If in step 110 the position X is moving away from X0, execution proceeds to step 112. In step 112, Fc is set to the intermediate magnitude Fa. If the system 10 includes active sub-bands, then Fc is set to the magnitude of the appropriate sub-band Fa1-Fan Execution then returns to step 102.

If in step 110 it is determined that the position is not moving away from equilibrium, execution proceeds to step 114. In step 114, Fc is set to the minimum magnitude Fmin. Execution then returns to step 102. In this condition, it is understood that the system 10 is moving toward equilibrium once again. The damper coefficient is set to Fmin in this instance in order to allow for the best possible isolation of the member 12. Once moving toward equilibrium from the active band, the control policy assumes that excessive deflection is not occurring and it is desirable at this time to provide a "softer" ride.

If in step 108 it is determined that the position X is not in the active band 92, i.e., the position is in the overshoot band, execution proceeds to step 116. In step 116, Fc is set to the maximum magnitude Fmax. In step 118, a determination is made whether the position X is at equilibrium X0. If the position is at X0, execution proceeds to step 114 and Fc is set to Fmin. If in step 118 the position is not at X0, execution returns to step 116 and Fc remains equal to Fmax until the equilibrium point X0 is reached. Accordingly, when the system 10 is returning out of the overshoot range 94 after a large input force to the system, the suspension remains highly damped until the equilibrium point is again reached. This allows the system 10 to return to the equilibrium point or ride height position X0 more quickly by dissipating as much energy as possible from the system 10. This allows the system 10 to stabilize without excessive heave.

Generally, the rate of execution of this repeat loop will be on the order of once every two to four milliseconds, however, such may vary and depend on the dynamics of the physical system.

Although not specifically illustrated in the drawings, it is understood that additional equipment and structural components will be provided as necessary, and that these and all of the components described above are arranged and supported in an appropriate fashion to form a complete and operative system 10 incorporating features of the present invention.

It is also understood that variations may be made in the present invention without departing from the spirit and scope of the invention. For example, the system 10 may be employed in automobiles, commercial vehicles, military vehicles, or may be used in aircraft or aerospace applications. The relatively movable members of the system 10 may be components of a truck cab suspension or other suspension which is not directly connected to an axle and tire member. The system 10 may also be used for improving isolation in stationary systems. It is contemplated that any one of a variety of force-controlled, orifice-setting or other valve arrangements may be used in conjunction with the system.

Although illustrative embodiments of the invention have been shown and described, a latitude of modification, change and substitution is intended in the foregoing disclosure, and in certain instances some features of the invention will be employed without a corresponding use of other features. Accordingly, it is appropriate that the appended claims be construed broadly and in a manner consistent with the scope of the invention.

I claim:

1. A method for controlling a system for attenuating the transmission of forces between first and second members spaced from each other to define a first relative position and movable relative to each other through a range of relative positions including an equilibrium position and at least one end-stop position, the system including a damper assembly interconnecting the members and generating a damper force opposing motion in response to relative movement between said first and second members, the method comprising:

monitoring conditions of operation of said system and producing a signal indicative of the relative position of said members;

setting said damper force to a preselected minimum magnitude responsive to said signal when said relative position is within a first range about said equilibrium position; and setting said damper force to a preselected maximum magnitude responsive to said signal when said relative position is within a second range about said at least one end-stop position, and maintaining said damper force at said maximum magnitude until said relative position is at said equilibrium position.

2. The method of claim 1 further comprising:

setting said damper force to said minimum magnitude responsive to said signal when said relative position first reaches said equilibrium position following being in said second range.

3. The method of claim 1 further comprising:

returning to said condition monitoring following setting said damper force.

4. The method of claim 1 further comprising:

setting said damper force to an intermediate magnitude responsive to said signal when said relative position is within a third range between said equilibrium and said end-stop positions and said relative position is moving away from said equilibrium position.

5. The apparatus of claim 1 further comprising:

setting said damper force to said minimum magnitude responsive to said signal when said relative position is within a third range between said equilibrium and said end-stop positions and said relative position is moving toward said equilibrium position.

6. The method of claim 1 wherein said minimum magnitude is approximately zero.

7. The method of claim 1 wherein said minimum magnitude is of a magnitude sufficiently stiff to control wheel hop.

8. The method of claim 1 wherein said condition monitoring step further comprises:

monitoring the relative velocity of said members and producing a signal indicative of said relative velocity;

time integrating said relative velocity signal to produce said signal indicative of relative position.

9. The method of claim 8 further comprising:

digitally filtering said time integrated signal to produce an offset signal and feeding it back to an analog summing device; combining said offset signal with said relative velocity signal in said analog summing device in order to center said time integrated signal thereby constraining said time integrated signal within an oscillatory voltage range to maintain a stabilized time integrated signal of a magnitude useful with analog circuit components.

10. The method of claim 9 further comprising:

filtering said stabilized time integrated signal so that it is constrained about a selected voltage value.

11. A method for controlling a system for attenuating the transmission of forces between first and second members spaced from each other to define a first relative position and movable relative to each other through a range of relative positions including an equilibrium position and at least one end-stop position, the system including a damper assembly interconnecting the members and generating a damper force Fc opposing motion in response to relative movement between said first and second members, the method comprising:

monitoring conditions of operation of said system and producing a signal indicative of the relative velocity of said members;

time integrating said relative velocity signal to produce a signal indicative of relative position;

digitally filtering said time integrated signal to produce an offset signal and feeding it back to an analog summing device;

combining said offset signal with said relative velocity signal in said analog summing device in order to center said time integrated signal thereby containing said time integrated signal within an oscillatory voltage range to maintain a stabilized time integrated signal of a magnitude useful with analog circuit components;

setting said damper force Fc to a preselected minimum magnitude Fmin responsive to said stable, time integrated signal when said relative position is within a first range about said equilibrium position; and setting said damper for to a preselected maximum magnitude Fmax responsive to said stable, time integrated signal when said relative position is within a second range about said at least one end-stop position, and maintaining said damper force at said maximum magnitude until said relative position returns to said equilibrium position.

12. Apparatus for controlling a system for attenuating the transmission of forces between first and second members spaced from each other to define a first relative position and movable relative to each other through a range of relative positions including an equilibrium position and at least one end-stop position, the system including a damper assembly interconnecting the members and generating a damper force Fc opposing motion in response to relative movement between said first and second members, and including at least one sensor to generate a signal indicative of a condition of operation of the members, the apparatus comprising:

control means for setting said damper force Fc to a preselected minimum magnitude Fmin responsive to said signal when said relative position is within a first range about said equilibrium position;

said control means setting said damper force Fc to a preselected maximum magnitude Fmax responsive to said signal when said relative position is within a second range about said at least one end-stop position, and maintaining said damper force at said maximum magnitude until said relative position returns to said equilibrium position.

13. The apparatus of claim 12 further comprising:
said control means setting said damper force to said minimum magnitude Fmin responsive to said signal when said relative position first returns to said equilibrium position following being in said second range.

14. The apparatus of claim 13 further comprising:
said control means returning to a condition monitoring mode following resetting said damper force to Fmin.

15. The apparatus of claim 12 further comprising:
said control means setting said damper force Fc to an intermediate magnitude Fa responsive to said signal when said relative position is within a third range between said equilibrium and said at least one end-stop and said relative position is moving away from said equilibrium position.

16. The apparatus of claim 12 further comprising:
said control means setting said damper force to said minimum magnitude responsive to said signal when the relative position is within a third range between said equilibrium and said at least one end-stop position and said relative position is moving toward said equilibrium position.

17. A method for producing a signal indicative of the relative position of a mass from a relative velocity input signal, the method comprising:
time integrating said relative velocity input signal to produce a signal indicative of relative position with an analog circuit; and
filtering said time integrated signal with a digital filter to produce an offset signal and feeding it back to an analog summing device;
combining said offset signal with said relative velocity signal in said analog summing device in order to center said time integrated signal thereby constraining said time integrated signal within an oscillatory voltage range to maintain a stabilized time integrated signal of a magnitude useful with analog circuit components.

18. The method of claim 17 further comprising:
filtering said stabilized time integrated signal so that it is constrained about a selected voltage value.

19. A computer implemented method for controlling a system for attenuating the transmission of forces between first and second members spaced from each other to define a first relative position and movable relative to each other through a range of relative positions including an equilibrium position and at least one end stop position, the system including a semiactive damper assembly interconnecting the members and generating a damper force Fc in response to relative movement between said first and second members, said method comprising the steps of:
a) receiving data indicative of the relative position of said members;
b) setting said damper force Fc to a preselected minimum magnitude Fmin responsive to said data when said relative position is within a first range about said equilibrium position;
c) setting said damper force to a preselected maximum magnitude Fmax responsive to said data when said relative position is within a second range about said at least one end-stop position;
d) maintaining said damper force at said maximum magnitude until said relative position returns to said equilibrium position;
e) setting said damper force Fc to said minimum magnitude Fmin responsive to said data when said relative position first reaches said equilibrium position following being in said second range;
f) setting said damper force Fc to an intermediate magnitude Fmin responsive to said data when said relative position is within a third range between said equilibrium and said at least one end-stop position and said relative position is moving away from said equilibrium position; and
g) setting said damper force Fc to said minimum magnitude Fmin responsive to said data when said relative position is within a third range between said equilibrium and said at least one end-stop position and said relative position is moving toward said equilibrium position.

* * * * *

UNITED STATES PATENT AND TRADEMARK OFFICE
CERTIFICATE OF CORRECTION

PATENT NO. : 5,276,623
DATED : January 4, 1994
INVENTOR(S) : Paul T. Wolfe It is certified that error appears in the above-identified patent and that said Letters Patent is hereby corrected as shown below:

Col. 5, line 4, after "members", insert --.--.

Col. 6, line 5, replace "ar" with --are--.

Col. 10, line 18, after "position", insert --X--.

Column 13,
Claim 15, line 22, after "end-stop", insert --position--.

Signed and Sealed this

Twelfth Day of July, 1994

*Attest:*

BRUCE LEHMAN

*Attesting Officer*     *Commissioner of Patents and Trademarks*